UNITED STATES PATENT OFFICE.

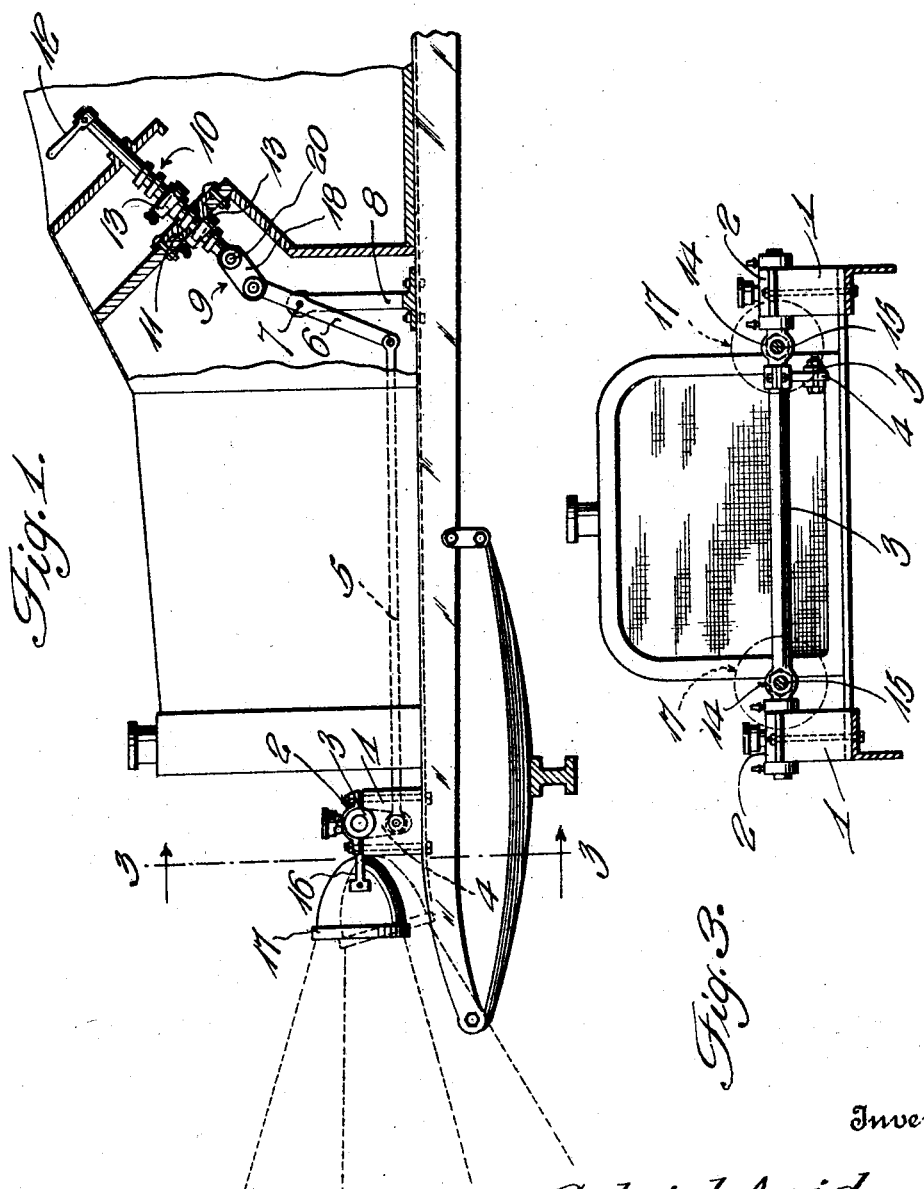

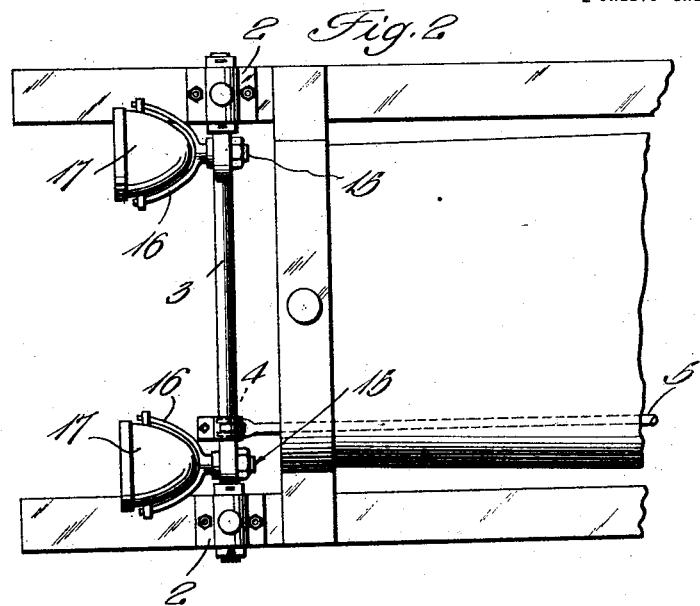
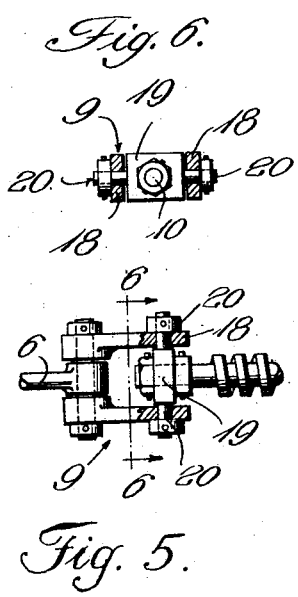
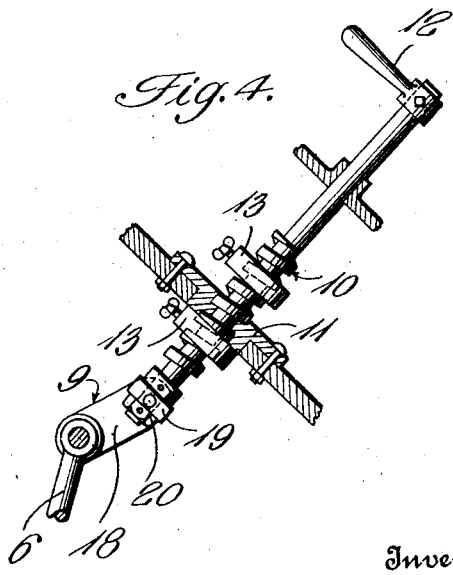

GABRIEL ACID, OF BUTTE, MONTANA.

DIRIGIBLE HEADLIGHT.

1,411,147. Specification of Letters Patent. Patented Mar. 28, 1922.

Application filed April 28, 1921. Serial No. 465,090.

*To all whom it may concern:*

Be it known that I, GABRIEL ACID, a citizen of the United States, residing at Butte, in the county of Silver Bow and State of Montana, have invented certain new and useful Improvements in Dirigible Headlights; and I do declare the following to be a full, clear, and exact description of the invention, such as will enable others skilled in the art to which it appertains to make and use the same.

The present invention relates to certain new and useful improvements in dirigible headlights for vehicles, it having for its principal object to provide a novel arrangement and mounting for headlights which enable the latter to be tilted vertically to throw the rays of light at many different angles on the roads, the construction and arrangement being advantageous in that it prevents the rays of light from blinding the drivers of approaching machines as is the case with the rigidly mounted headlights now commonly installed on vehicles.

Another object of the invention is to generally improve upon headlights and mounting means therefor by the provision of a practical and simplified structure wherein the lights may be held in any desired angular position and can be conveniently controlled by the driver of the machine from the dash-board, on which the operating means is mounted.

Other objects and advantages of the invention will be apparent during the course of the following description.

In the accompanying drawings forming a part of this specification and in which like numerals are employed to designate like parts throughout the same:

Figure 1 is a side elevational view of a portion of an automobile, with parts in section, showing my improved headlights and mounting and operating means thereon.

Figure 2 is a top plan view thereof.

Figure 3 is a sectional view taken substantially on the plane of the line 3—3 of Fig. 1.

Figure 4 is an enlarged detail view of the hand-operated screw.

Figure 5 is a detail elevational view, with parts in section, of the novel coupling between the operating screw and vertical pivoted arm.

Figure 6 is a sectional view taken substantially on the plane of the line 6—6 of Fig. 5.

In carrying out the invention, I secure in any suitable way, on the side bars of the vehicle near the forward end thereof, bearing members 1, including removable brackets 2. In these bearings, a rock shaft 3 is journalled, the latter being equipped near one end with a detachable crank arm 4 which has connected with it, a rearwardly extending longitudinally movable rod 5, this rod being pivotally connected at its rear end to the lower end of a substantially vertically disposed arm 6. Arm 6 in turn is pivoted intermediate its ends as indicated at 7 on the upper end of a rigid standard 8 secured at any suitable point on the vehicle. The operating screw 10, which is mounted on the dash-board, is connected to the upper end of said arm 6 through the medium of a novel connecting device 9 to be hereinafter more specifically described. While the operating screw may be mounted on the dash-board in various other ways, I prefer to secure on this part of the vehicle, an internally screw-threaded bushing or collar 11 and extend the screw-threaded portion of the screw through this bushing so that when it is rotated, it will impart a swinging movement to the arm 6 and in turn rotate the rock shaft 3. The non-threaded portion of the operating screw extends rotatably through an opening in the instrument-board and is provided on its upper end with an operating handle 12. At this point, I wish to direct attention to the fact that it is desirable to limit the movement of the operating screw in opposite directions so that the rock shaft may be rotated to the desired pre-determined degree. In carrying this out, I employ a pair of adjustable stop collars 13, one of these collars being arranged on the operating screw above the dash-board and the other collar being arranged on the screw below the dash-board. It is obvious that by properly adjusting these collars, the movement of the operating screw in opposite directions can be limited.

Referring again to the rock shaft 3, it will be seen that it is flattened near its opposite ends as indicated at 14 and these flattened portions are apertured to permit the screw-threaded shanks 15 of the lamp-supporting yokes 16 to be passed therethrough, nuts being arranged on the free ends of the shanks to hold them in place on the rock shaft. The headlights 17 are fixedly mounted between the arms as shown.

It has been before suggested that the connecting member 9 between the operating screw and arm 6 will be described in detail. Therefore, by referring to Figs. 5 and 6 wherein it is more clearly shown, it will be seen that it includes among other things, a pair of spaced links 18 which are pivotally connected with the upper end of the arm 6. Arranged between the opposite ends of these links is a flat block-like member which may well be termed a head 19. This head includes studs 20 which have detachable connection with the last-named ends of the links. The head 19 is centrally apertured and the lower end of the operating screw passes loosely through the same thus providing the desired swivel connection between this connecting device and operating screw.

In operation, it will be seen that by grasping the handle 12 and rotating it in one or another direction, the operating screw 10 will be moved rearwardly or forwardly as the case may be. In so doing, the arm 6 will be rocked on its pivot and will impart longitudinal movement to the rod 5, which in turn will rotate the rock shaft 3 in its bearings. It is obvious that this operation of parts will tilt the headlights vertically. As before indicated, by properly adjusting the stop collars 13 on the operating screw, the tilting movement of the headlights can be limited.

A careful consideration of the foregoing description taken in connection with the accompanying drawings is thought to be sufficient to enable persons skilled in the art to which the invention relates, to obtain a clear understanding of the same. Therefore, a more lengthy and detailed description is deemed unnecessary.

In all probability, effective and advantageous results are assured with the construction and arrangement of parts herein shown and described. However, I wish it to be understood that various minor changes coming within the scope of the subjoined claims may be resorted to.

I claim:

1. The combination with a vehicle; of a stationary standard secured on a part of the vehicle, an arm pivoted intermediate its ends on the upper end of the standard, an operating screw on the dash-board, a connecting member including a pair of links connected at one of their ends to said arm, and an apertured head including studs to which the opposite ends of the links are connected, said screw passing rotatably through the aperture in said head, tilting headlights on the forward end of the vehicle, and means between the lights and arm for controlling said lights.

2. The combination with a vehicle; of a rock shaft mounted on the forward end thereof, headlights rigidly connected to said shaft, an internally screw-threaded bushing mounted on the dash-board of the vehicle, an operating screw passing through said bushing, an upstanding stationary bracket, an arm pivoted intermediate its ends on said bracket, a longitudinally movable bar connected with rock shaft and with the lower end of said arm, and a coupling between the upper end of the latter and the lower end of said operating screw, said screw having swivel connection with this coupling.

In testimony whereof I have hereunto set my hand.

GABRIEL ACID.